UNITED STATES PATENT OFFICE.

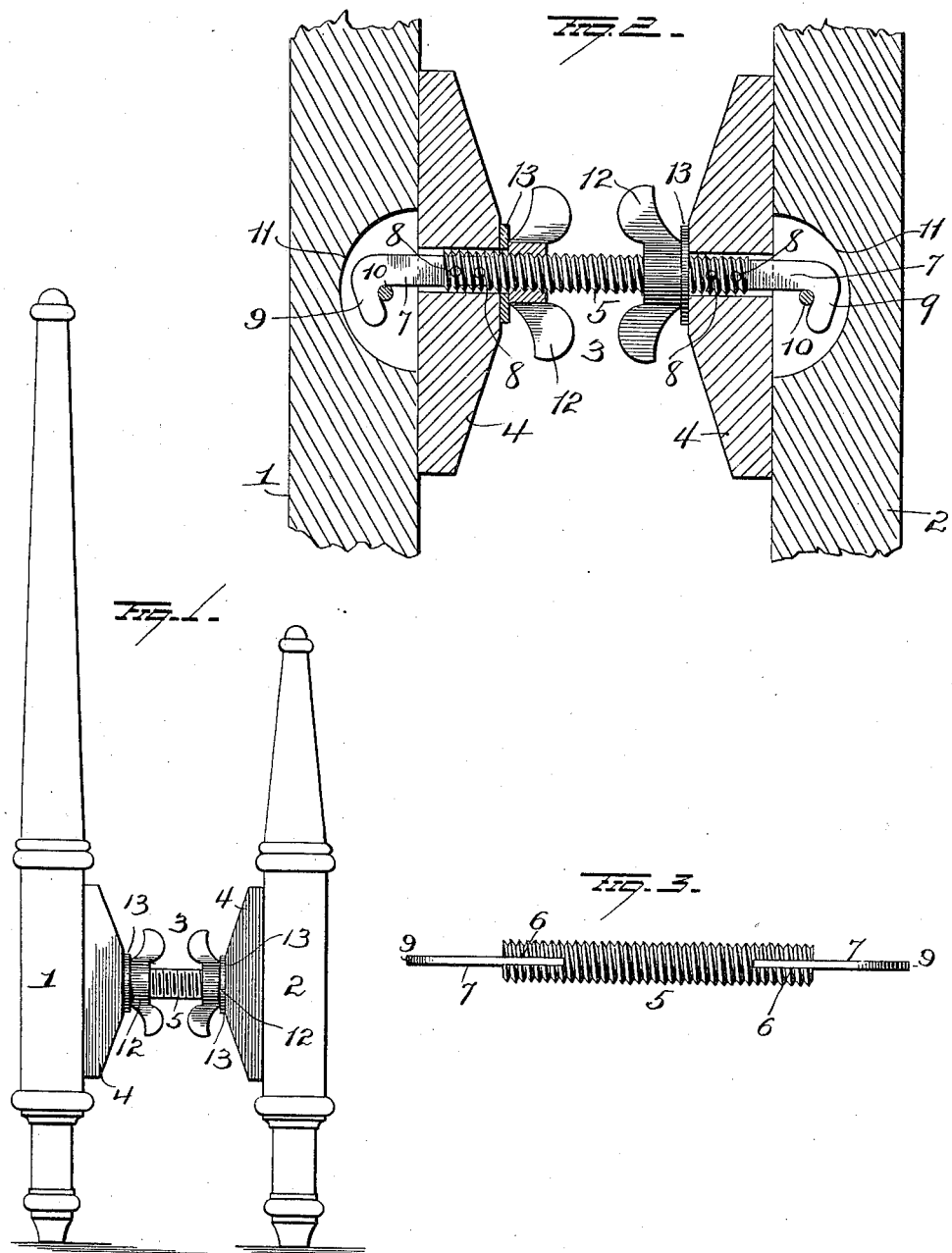

HENRY J. MONTGOMERY, OF SILVER CREEK, NEW YORK.

LOCKING DEVICE FOR BEDS.

1,030,008.

Specification of Letters Patent. Patented June 18, 1912.

Application filed April 27, 1912. Serial No. 693,674.

*To all whom it may concern:*

Be it known that I, HENRY J. MONTGOMERY, a resident of Silver Creek, in the county of Chautauqua and State of New York, have invented certain new and useful Improvements in Locking Devices for Beds; and I do hereby declare the following to be a full, clear, and exact description of the invention, such as will enable others skilled in the art to which it appertains to make and use the same.

This invention relates to improvements in locking devices for beds and more particularly to means for uniting the head and foot sections of beds in comparatively close proximity to each other to facilitate exhibiting the beds and also their transportation, the object of the invention being to provide simple and efficient devices which can be easily and quickly attached to or removed from the bed sections and which, when in use will securely lock said sections together but spaced a short distance apart.

With this object in view the invention consists in certain novel features of construction and combinations of parts as hereinafter described and pointed out in the claims.

In the accompanying drawings, Figure 1 is a view showing the application of my improvements. Fig. 2 is an enlarged sectional view, and Fig. 3 is a separate view of the threaded rod with the hook members secured thereto.

It will be understood that two locking devices, such as hereinafter described, will be employed for each bed but a detailed description of one of said devices will suffice for both.

1—2 represent the head and foot members of a bed and 3 my improved locking device which is disposed between the legs of said head and foot members. The locking device comprises two blocks 4—4 adapted to rest against the legs of the head and foot bed members and these blocks are provided centrally with holes through which a threaded rod 5 freely passes. The rod 5 is provided at its respective ends with slots 6 in which bars 7 are disposed and securely fastened by means of rivets 8. Each bar 7 is provided at its free end with a hook 9 to engage a pin 10 passing transversely through a slot 11 in the leg of the adjacent bed section. Two thumb nuts 12—12 are mounted on the threaded rod 5 between the blocks 4 and between each of said thumb-nuts and the adjacent block 4, a washer 13 is disposed. It is apparent that the thumb nuts and washers will be placed on the threaded rod before both of the hook-bars are secured to said rod and before both of the blocks 4 shall have been placed in position on the rod.

When the head and foot members of the bed shall have been brought into comparatively close proximity to each other, the hook portions at the ends of the threaded rod will be made to engage pins 10 in the legs of the bed members and then the thumb-nuts 12 will be screwed toward respective ends of the threaded rod and cause the blocks 4 to tightly engage the inner faces of the legs of the two bed members, thus insuring locking engagement of the hooks 9 with the pins 10 and locking the bed members together but spacing them a short distance apart and allowing the assembled bed members to stand in upright positions.

Having fully described my invention what I claim as new and desire to secure by Letters-Patent, is:—

1. In locking devices for beds, the combination of a threaded rod provided at its ends with hook portions, blocks loosely mounted on said threaded rod, and nuts on the threaded rod to clamp said blocks against bed members.

2. In locking devices for beds, the combination with two clamping blocks, a rod passing through said blocks and provided at its ends with hooks, of means mounted on the rod between the clamping blocks for forcing the latter outwardly.

In testimony whereof, I have signed this specification in the presence of two subscribing witnesses.

HENRY J. MONTGOMERY.

Witnesses:
ALLEN D. BEEMASTER,
GEORGE B. SALISBURY.

Copies of this patent may be obtained for five cents each, by addressing the "Commissioner of Patents, Washington, D. C."